United States Patent
Kisiler (10) Patent No.: US 11,938,928 B2
(45) Date of Patent: Mar. 26, 2024

(54) SYSTEMS AND METHODS FOR VEHICULAR NAVIGATION OF NARROW GAPS

(71) Applicant: Honda Motor Co., Ltd., Tokyo (JP)

(72) Inventor: Mark Kisiler, Torrance (CA)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 17/518,150

(22) Filed: Nov. 3, 2021

(65) Prior Publication Data

US 2023/0135931 A1  May 4, 2023

(51) Int. Cl.
| | |
|---|---|
| *B60W 30/09* | (2012.01) |
| *B60W 10/04* | (2006.01) |
| *B60W 10/18* | (2012.01) |
| *B60W 10/20* | (2006.01) |
| *B60W 50/14* | (2020.01) |
| *G01S 17/931* | (2020.01) |
| *B60R 1/074* | (2006.01) |

(Continued)

(52) U.S. Cl.
CPC ............ *B60W 30/09* (2013.01); *B60W 10/04* (2013.01); *B60W 10/18* (2013.01); *B60W 10/20* (2013.01); *B60W 50/14* (2013.01); *G01S 17/931* (2020.01); *B60R 1/074* (2013.01); *B60W 60/0051* (2020.02); *B60W 2420/42* (2013.01); *B60W 2420/52* (2013.01); *B60W 2530/201* (2020.02); *B60W 2554/4026* (2020.02); *B60W 2554/801* (2020.02); *B62D 15/0265* (2013.01)

(58) Field of Classification Search
CPC ...... B60W 30/09; B60W 10/04; B60W 10/18; B60W 10/20; B60W 50/14; B60W 2554/4026; B60W 2530/201; B60W 60/0051; B60W 2554/801; B60W 2420/42; B60W 2420/52; G01S 17/931; B60R 1/074; B62D 15/0265
USPC .......................................................... 701/26
See application file for complete search history.

(56) References Cited

U.S. PATENT DOCUMENTS

| | | |
|---|---|---|
| 9,134,732 B2 | 9/2015 | Shin |
| 9,308,916 B2 | 4/2016 | Buerkle et al. |
| 10,466,715 B2 | 11/2019 | You et al. |

(Continued)

FOREIGN PATENT DOCUMENTS

| | | |
|---|---|---|
| CN | 111624991 A | 9/2020 |
| CN | 111806433 A | 10/2020 |

(Continued)

*Primary Examiner* — Tuan C To
(74) *Attorney, Agent, or Firm* — Armstrong Teasdale LLP (57) ABSTRACT

A vehicle is provided. The vehicle includes a plurality of sensors including a first sensor and a second sensor. The vehicle also includes a vehicle controller. The vehicle controller is programmed to (i) collect a first plurality of sensor information observed by the first sensor during operation of the vehicle; (ii) analyze the first plurality of sensor information to detect a gap along the vehicle's path of travel; (iii) compare one or more dimensions of the gap to one or more dimensions of the vehicle; (iv) receive a second plurality of sensor information from the second sensor; and (v) control the vehicle to travel through the gap based on the comparison of the one or more dimensions of the gap to the one or more dimensions of the vehicle and the second plurality of sensor information from the second sensor.

20 Claims, 4 Drawing Sheets

(51) Int. Cl.
*B60W 60/00* (2020.01)
*B62D 15/02* (2006.01)

(56) References Cited

U.S. PATENT DOCUMENTS

| | | | |
|---|---|---|---|
| 2002/0183906 A1* | 12/2002 | Ikeda | G01C 21/3844 |
| | | | 348/148 |
| 2010/0094541 A1* | 4/2010 | Gresser | B62D 15/0295 |
| | | | 348/149 |
| 2010/0274446 A1* | 10/2010 | Sasajima | G08G 1/165 |
| | | | 701/36 |
| 2015/0066349 A1* | 3/2015 | Chan | G01C 21/3697 |
| | | | 701/400 |
| 2018/0058878 A1* | 3/2018 | Roth | G08G 1/096827 |
| 2018/0164832 A1* | 6/2018 | You | B60W 40/02 |
| 2019/0196486 A1 | 6/2019 | Ishikawa et al. | |
| 2019/0278283 A1 | 9/2019 | Gai et al. | |
| 2019/0375410 A1* | 12/2019 | Zinner | B60W 30/095 |
| 2020/0218907 A1 | 7/2020 | Baik et al. | |
| 2020/0240795 A1* | 7/2020 | Nomura | G01C 21/3819 |
| 2020/0257301 A1* | 8/2020 | Weiser | G06N 3/02 |
| 2020/0372262 A1* | 11/2020 | Ma | G06V 20/588 |
| 2021/0049780 A1* | 2/2021 | Westmacot | G06V 10/82 |
| 2021/0063162 A1* | 3/2021 | Moskowitz | G01C 21/28 |
| 2022/0001872 A1* | 1/2022 | Taieb | G01C 21/20 |
| 2022/0219732 A1* | 7/2022 | Yoshizawa | G01S 13/931 |
| 2023/0040783 A1* | 2/2023 | Choi | B60W 60/0011 |

FOREIGN PATENT DOCUMENTS

| | | | |
|---|---|---|---|
| EP | 1262739 A1 * | 12/2002 | B62D 15/029 |
| EP | 3168083 A1 * | 5/2017 | B60D 1/30 |
| EP | 2820636 B1 | 4/2019 | |
| JP | 2020152288 A | 9/2020 | |
| WO | WO-9305492 A1 * | 3/1993 | G01C 21/26 |

* cited by examiner

SYSTEMS AND METHODS FOR VEHICULAR NAVIGATION OF NARROW GAPS

FIELD OF THE INVENTION

The present disclosure relates to vehicular control and navigation and, more particularly, to a system and method for controlling a vehicle travelling through a narrow gap.

BACKGROUND

In some locations, there are narrow gaps or passages that vehicles, such as automobiles, can attempt to pass through. In some of these narrow passages, the gap that the vehicle must pass through is barely wider than the vehicle. Failure of the driver to properly navigate through the passage can cause damage to the vehicle and/or the passage itself. Furthermore, in some situations, an autonomous vehicle will ask the driver to take over during difficult maneuvers. Accordingly, it would be desirable to have a system that assists drivers in navigating through narrow gaps and/or passages to prevent damage.

BRIEF SUMMARY

In one aspect, a vehicle is provided. The vehicle includes a plurality of sensors including a first sensor and a second sensor. The vehicle also includes a vehicle controller. The vehicle controller is programmed to collect a first plurality of sensor information observed by the first sensor during operation of the vehicle. The vehicle controller is also programmed to analyze the first plurality of sensor information to detect a gap along the vehicle's path of travel. The vehicle controller is further programmed to compare one or more dimensions of the gap to one or more dimensions of the vehicle. In addition, the vehicle controller is programmed to receive a second plurality of sensor information from a second sensor. Furthermore, the vehicle controller is programmed to control the vehicle to travel through the gap based on the comparison of the one or more dimensions of the gap to the one or more dimensions of the vehicle and the second plurality of sensor information from the second sensor. The vehicle may have additional, less, or alternate functionality, including that discussed elsewhere herein.

In another aspect, a computer device is provided. The computer device includes at least one memory and at least one processor in communication with the at least one memory. The at least one processor is programmed to collect a first plurality of sensor information observed by a first sensor during operation of a vehicle. The at least one processor is also programmed to analyze the first plurality of sensor information to detect a gap along the vehicle's path of travel. The at least one processor is further programmed to compare one or more dimensions of the gap to one or more dimensions of the vehicle. In addition, the at least one processor is programmed to receive a second plurality of sensor information from a second sensor different than the first sensor. Furthermore, the at least one processor is to control the vehicle to travel through the gap based on the comparison of the one or more dimensions of the gap to the one or more dimensions of the vehicle and the second plurality of sensor information from the second sensor. The computer device may have additional, less, or alternate functionality, including that discussed elsewhere herein.

In still another aspect, a method for controlling a vehicle is provided. The method is implemented on a vehicle controller associated with the vehicle including at least one processor in communication with at least one memory. The method includes collecting a first plurality of sensor information observed by a first sensor during operation of a vehicle. The method also includes analyzing the first plurality of sensor information to detect a gap along the vehicle's path of travel. The method further includes comparing one or more dimensions of the gap to one or more dimensions of the vehicle. In addition, the method includes receiving a second plurality of sensor information from a second sensor different than the first sensor. Furthermore, the method includes controlling the vehicle to travel through the gap based on the comparison of the one or more dimensions of the gap to the one or more dimensions of the vehicle and the second plurality of sensor information from the second sensor. The method may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for controlling a vehicle travelling through a narrow gap based upon sensor data. In an exemplary embodiment, the process is performed by a vehicle controller computer device, also known as a vehicle controller.

In the exemplary embodiment, the vehicle includes a plurality of sensors that allow the vehicle to observe its surroundings in real-time. The sensors can include, but are not limited to, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. The vehicle controller receives information from the sensors. Based on the information from the sensors, the vehicle controller determines that there is a gap along the vehicle's line of travel. The vehicle controller determines if the vehicle can travel through the gap. The gap can include sides as well as a top or ceiling that the vehicle will have to fit under.

The vehicle controller determines the profile of the vehicle and compares that to the horizontal and vertical measurements of the gap to determine if the vehicle will fit through the gap. If the vehicle will not fit, then the vehicle controller informs the driver. If the vehicle will fit through the gap (both the horizontal and vertical dimensions), the vehicle controller confirms that there aren't any extra protrusions that could affect the vehicle's profile, such as cargo carriers or sporting equipment. The vehicle controller may also have the side mirrors retracted, either automatically or manually by the driver/passengers, to allow the vehicle to have more horizontal clearance through the gap.

In the exemplary embodiment, the vehicle controller detects the gap using a first set of sensors, such as LIDAR, RADAR, and/or cameras. When the vehicle reaches the gap, the vehicle controller receives information from a second set of sensor, such as proximity sensors. In the exemplary embodiment, the proximity sensors includes ultrasonic and electromagnetic sensors. For example, the proximity sensors could be sensors that are used for detecting objects near the vehicle, such as during parking or for detecting cross traffic. In some embodiments, the proximity sensors detect objects near and around the bumper of the vehicle, such as within two meters.

While travelling through the gap, the vehicle controller receives real-time sensor data for navigation through the gap. The vehicle controller uses the steering, throttle, and braking systems to navigate the vehicle through the gap. When the vehicle is through the gap, the vehicle controller may relinquish control of the vehicle to the driver or continue driving in the case of an autonomous vehicle.

In some embodiments, the user/driver may store preferences that would let the vehicle controller know if there are any extra protrusions from the vehicle, such as bicycles and cargo carriers. The preferences may also include a known height and/or width of the vehicle, that is different from the traditional values. Such as if the vehicle has a heightened suspension or extra-large wheels.

At least one of the technical problems addressed by this system may include: (i) improving the accuracy of vehicular travel through narrow gaps; (ii) reducing the likelihood of accidents involving a vehicle travelling through a gap; (iii) reducing the chance of damage to a vehicle and/or objects along or near a roadway; and (iv) reducing the chance of damage to objects attached to a vehicle.

The methods and systems described herein may be implemented using computer programming or engineering techniques including computer software, firmware, hardware, or any combination or subset thereof, wherein the technical effects may be achieved by performing at least one of the following steps: a) collect a first plurality of sensor information observed by a first sensor during operation of the vehicle; b) analyze the first plurality of sensor information to detect a gap along the vehicle's path of travel; c) compare one or more dimensions of the gap to one or more dimensions of the vehicle; d) receive a second plurality of sensor information from a second sensor different than the first sensor, wherein the first sensor is at least one of a camera or LIDAR, and wherein the second sensor is a proximity sensor; e) control the vehicle to travel through the gap based on the comparison of the one or more dimensions of the gap to the one or more dimensions of the vehicle and the second plurality of sensor information from the second sensor; f) determine a center line of travel for the vehicle through the horizontal gap to avoid impacting one or more sides of the gap, where the gap is a horizontal gap; g) determine that one or more side mirrors need to be retracted prior to travel through the gap; h) instruct at least one of a driver and/or a passenger to retract the one or more side mirrors prior to travel through the gap; i) instruct the vehicle to retract the one or more side mirrors; j) store one or more preferences for travel through gaps, wherein the one or more preferences include one or more protrusions on the vehicle that affect the one or more dimensions of the vehicle; k) query at least one individual in the vehicle about one or more protrusions to the vehicle that affect the one or more dimensions of the vehicle; l) where the gap is a vertical gap, i) determine a vertical dimension of the vehicle; ii) determine a vertical dimension of the gap; and iii) compare the vertical dimension of the vehicle to the vertical dimension of the gap; m) request control of the vehicle from the driver; n) determine if the vehicle will fit through the gap based on the comparison; o) stop the vehicle if the determination is that the vehicle will not fit through the gap; p) control the vehicle by transmitting instructions to one or more of a steering system, a throttle system, and a braking system of the vehicle; q) continuously receive real-time sensor information from the plurality of sensors while travelling through the gap; r) control the vehicle based on the real-time sensor information; s) control the vehicle to travel in a rearward direction; t) control the vehicle by providing steering assistance to the driver to assist the driver in travelling through the gap; u) determine if the vehicle is subscribed to a narrow gap subscription service before controlling the vehicle to travel through the gap; v) detect a cyclist on one side of the gap; w) determine a safe clearance for the cyclist; and x) control the vehicle to travel based on the safe clearance for the cyclist.

Exemplary Vehicle

Figure 1:
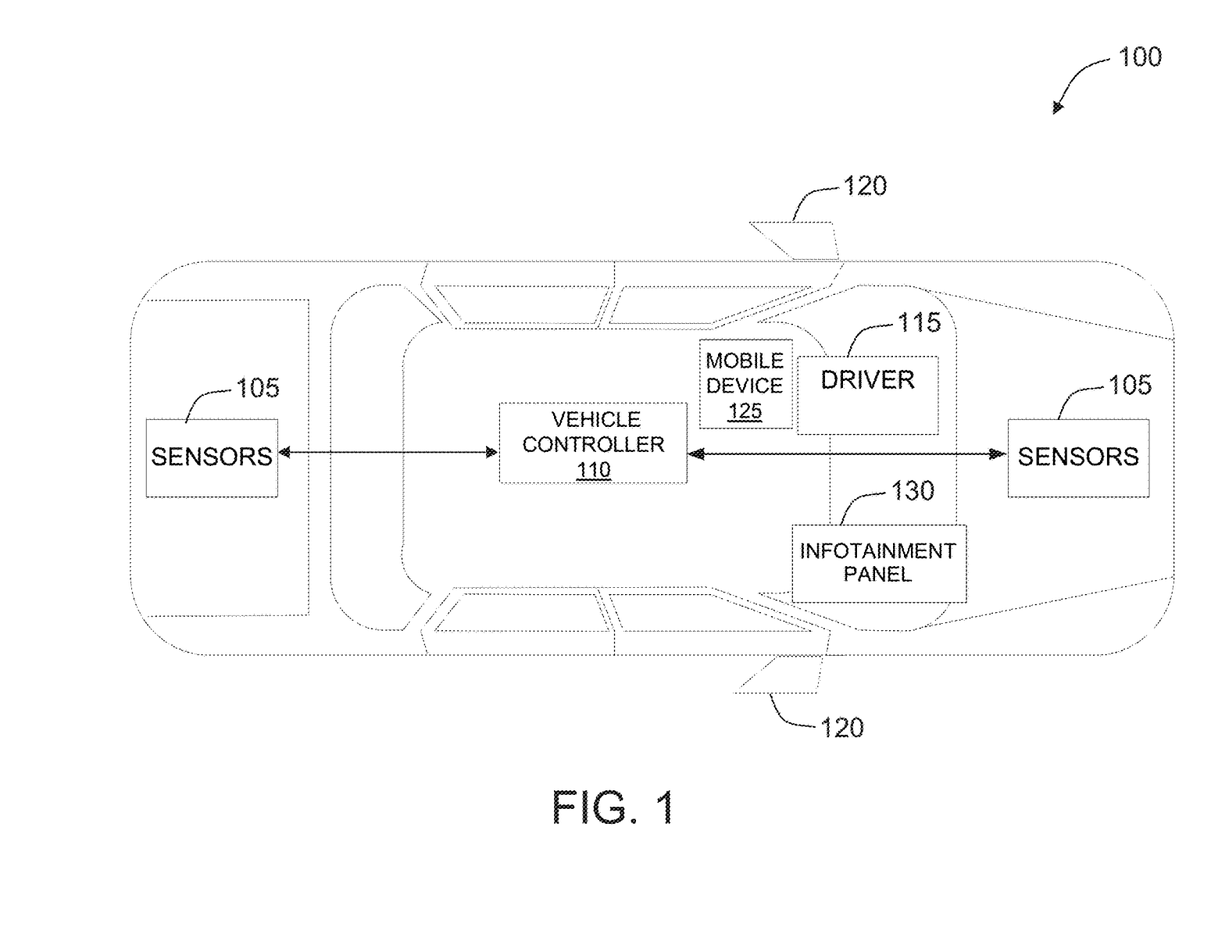
FIG. 1 illustrates a schematic diagram of an exemplary vehicle, in accordance with one embodiment of the present disclosure.

FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 is a manual vehicle or a semi-autonomous vehicle with driver assistance systems, such as, but not limited to, lane keep assistance and parallel parking assistance, where the vehicle may be as a traditional automobile that is controlled by a driver 115.

Vehicle 100 may include a plurality of sensors 105 and a vehicle controller 110. The plurality of sensors 105 may detect the current surroundings and location of vehicle 100. Plurality of sensors 105 may include, but are not limited to, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. Plurality of sensors 105 may also include sensors that detect conditions of vehicle 100, such as speed, acceleration, gear, braking, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, plurality of sensors 105 may include impact sensors that detect impacts to vehicle 100, including force and direction and sensors that detect actions of vehicle 100, such the deployment of airbags. In some embodiments, plurality of sensors 105 may detect the presence of driver 115 and one or more passengers (not shown) in vehicle 100. In these embodiments, plurality of sensors 105 may detect the presence of fastened seatbelts, the weight in each seat in vehicle 100, heat signatures, or any other method of detecting information about driver 115 and/or passengers in vehicle 100.

In some embodiments, the plurality of sensors 105 may include sensors for determining weight distribution information of vehicle 100. Weight distribution information may include, but is not limited to, the weight and location of remaining gas, luggage, occupants, and/or other components of vehicle 100. In some embodiments, plurality of sensors 105 may include sensors for determining remaining gas, luggage weight, occupant body weight, and/or other weight distribution information. Furthermore, the plurality of sensors 105 may detect attachments to the vehicle 100, such as cargo carriers or bicycle racks attached to the top of the vehicle 100 and/or a trailer attached to a hitch on the rear of the vehicle 100.

In one example, plurality of sensors 105 may include LIDAR, radar, weight sensors, accelerometer, gyroscope, compass and/or other types of sensors to identify the orientation and profile of the vehicle 100. Vehicle controller 110 and/or another computing device(s) (e.g., mobile device(s)) may be configured to monitor sensor data from plurality of sensors 105 and/or other sensors to determine weight distribution information and/or location and orientation of the vehicle 100. In one example, vehicle controller 110 may compare sensor data for a particular event (e.g., a road bump) with historical sensor data to identify the weight distribution of vehicle 100 and/or the location of the occupants of vehicle 100. In another example, plurality of sensors 105 may include weight sensors that vehicle controller 110 monitors to determine the weight distribution information.

Furthermore, vehicle 100 may have one or more protrusions, such as side mirrors 120, that can temporarily change the profile of the vehicle. Examples of protrusions can include, but are not limited to, side mirrors, antenna, top mounted cargo racks. In some embodiments, the plurality of sensors 105 can determine when and how the protrusions are affecting the profile of the vehicle 100. For example, the plurality of sensors 105 could determine that the side mirrors 120 are extended or retracted. The plurality of sensors 105 could also determine if there is a cargo carrier attached to the top mounted cargo racks. In some other embodiments, the vehicle controller 110 can ask the driver 115 about the potential protrusions, for example, if a bicycle or other object is mounted to the roof of the vehicle 100. In some embodiments, the vehicle controller 110 may ask the user at the beginning of the ride. In other embodiments, the vehicle controller 110 queries the driver 115 about protrusions when a narrow gap or other potential obstruction is detected. In some embodiments, the vehicle controller 110 communicates with the user via a mobile device 125 associated with the driver 115. In other embodiments, the vehicle controller 110 communicates via a user interface of the vehicle 100, such as through an infotainment panel 130.

Vehicle controller 110 may interpret the sensory information to identify appropriate navigation paths, detect threats, and react to conditions. In some embodiments, vehicle controller 110 may be able to communicate with one or more remote computer devices, such as mobile device 125. In the example embodiment, mobile device 125 is associated with driver 115 and includes one or more internal sensors, such as an accelerometer, a gyroscope, and/or a compass. Mobile device 125 may be capable of communicating with vehicle controller 110 wirelessly. In addition, vehicle controller 110 and mobile device may be configured to communicate with computer devices located remotely from vehicle 100.

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; hazard avoidance; navigation or GPS-related systems; security and/or anti-hacking measures; and/or theft prevention systems.

While vehicle 100 may be an automobile in the exemplary embodiment, in other embodiments, vehicle 100 may be, but is not limited to, other types of ground craft, aircraft, watercraft, and spacecraft vehicles.

Figure 2A:
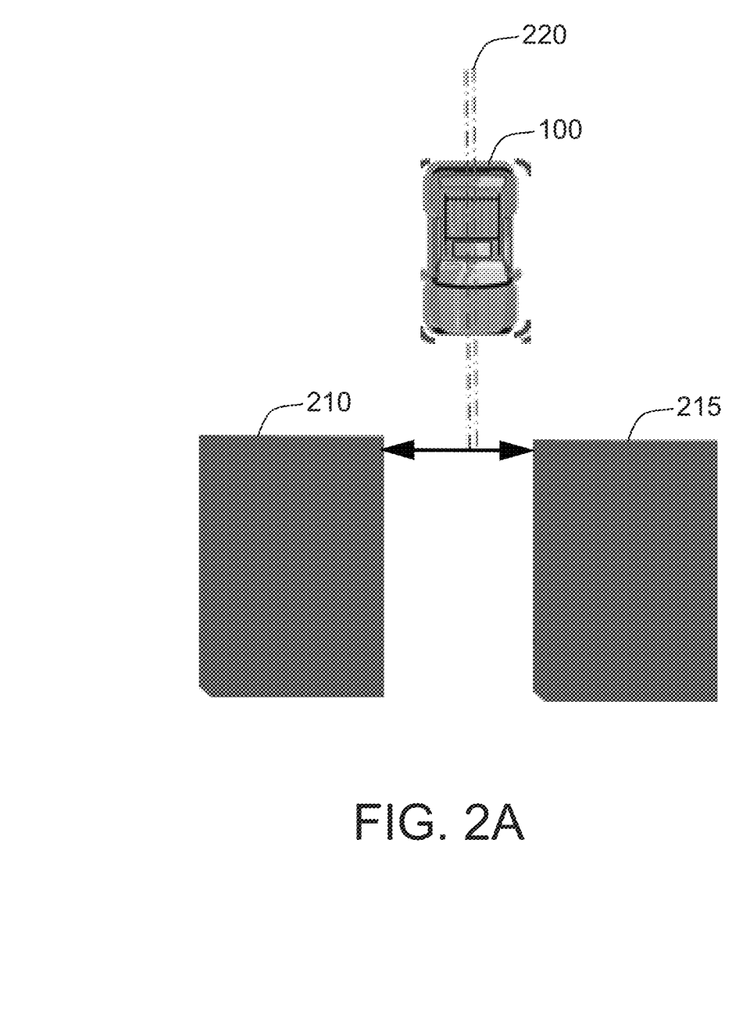
FIGS. 2A and 2B illustrate an overview diagram of the vehicle shown in FIG. 1 approaching and passing through a narrow passage or gap, in accordance with one embodiment of the present disclosure.
Figure 2B:
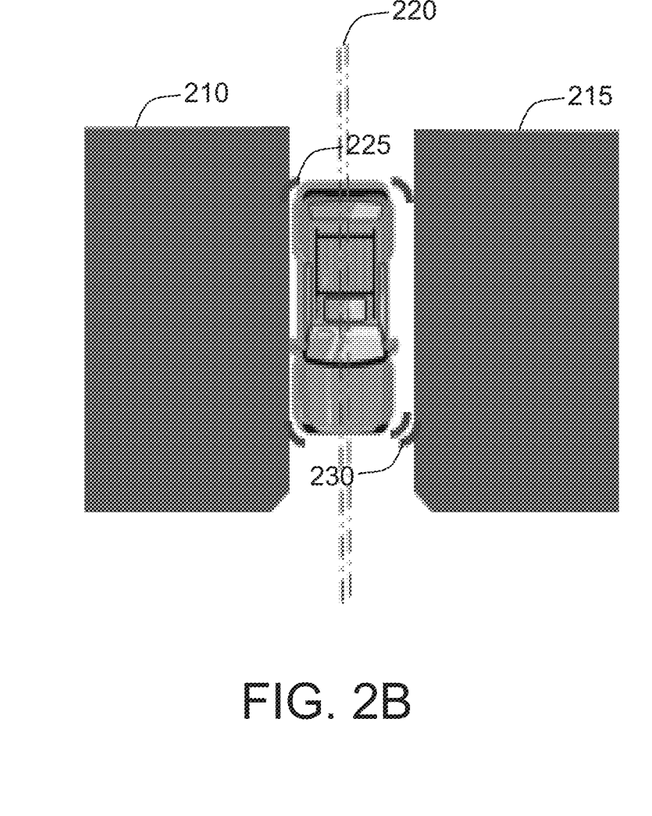

FIGS. 2A and 2B illustrate an overview diagram of the vehicle 100 (shown in FIG. 1) approaching and passing through a narrow passage or gap 205, in accordance with one embodiment of the present disclosure. The gap 205 that the vehicle is approaching includes a first side 210 and a second side 215. The gap 205 may be a part of and include, but is not limited to, a narrow street, an alley, a garage, a car wash, a toll booth, a fueling station, between two bollards, a gate, a very narrow parking space, an entrance, between two trees, between stopped or parked vehicles, and/or any other narrow gap 205 that it is desirable for a vehicle 100 to safely pass through. In some embodiments, the gap 205 continues for a very short distances, such as a gate. In other embodiments, the gap 205 continues for a significant distance, such as a narrow street or alley. In some further embodiments, there may be multiple gaps 205 of different widths, such as in an alleyway with dumpsters and other obstacles.

While the gap 205 shown in FIG. 2A is horizontal, the gap may also have a ceiling or overhead clearance (not shown) where the vehicle 100 must pass under the ceiling or overhead object. For example, the gap 205 may be in a parking garage where there is a maximum safe clearance. The systems and methods described herein can be applied to the vertical gap as well as the horizontal gap.

In the exemplary embodiment, the vehicle 100 approaches the gap 205. The sensors 105 (shown in FIG. 1) detect the gap 205. For example, the long-range RADAR, LIDAR, and/or cameras could detect that there is a gap 205 ahead. The sensors 105 would then then determine the width of the gap 205 by determining the distance between the first side 210 and the second side 215. In the exemplary embodiment, the gap 205 would be detected a half a block away or any other distance that allows the vehicle 100 to safely react based on the speed of the vehicle 100.

In the exemplary embodiment, the vehicle controller 110 (shown in FIG. 1) ensures that the vehicle 100 is travelling along a center line 220 to ensure that the vehicle 100 does not impact either side 210 or 215 of the gap 205. In the exemplary embodiment, the vehicle controller 110 is in control of the vehicle 100 while travelling through the gap 205. The vehicle controller 110 can be in control due to the vehicle 100 being autonomous or the vehicle 100 being semiautonomous, where the driver 115 (shown in FIG. 1) temporarily relinquishes control of the vehicle 100 to the vehicle controller 110 while travelling through the gap 205. In still other embodiments, the vehicle controller 110 provides narrow gap assistance by providing nudges and/or weighted steering to the driver 115 through the steering system, where the driver 115 is still in control of the vehicle 100, but the vehicle controller 110 assists the driver 115 in staying in the center of the gap 205.

While travelling through the gap 205 as shown in FIG. 2B, the vehicle controller 110 calculates the center line 220 to drive the vehicle 100 along so that there is a clearance 225 and 230 on each side of the vehicle, such that the clearances 225 and 230 allows the vehicle 100 to pass through the gap 205 without impacting either side 210 or 215. In the exemplary embodiment, the vehicle controller 110 receives information from sensors 105 to determine where the center line 220 is, such as proximity sensors 105.

While FIGS. 2A and 2B illustrate the vehicle traveling forward through the gap 205, the systems and methods described herein can also be used for a vehicle 100 traveling in reverse through a gap 205. This may be especially useful for situations where the driver 115 needs to extricate themselves from a tight situation that they pulled into. In general, it is easier for drivers 115 to drive their vehicles 100 forward, than in reverse and having this system would reduce accidents and damage to the vehicle 100 in these narrow situations.

In some further embodiments, the gap 205 is between a cyclist on the first side 210 and a lane marker or another vehicle 100 on the second side 215. In some situations, cyclists can be on the edge of the bicycle lane due to parked cars. At traditional city street speeds of 30 to 40 miles per hour, it can be difficult for drivers 115 to determine where to be in the lane to avoid the cyclist as well as other vehicles 100 in traffic. In these embodiments, the vehicle controller 110 determines a minimum safe clearance 225 for the cyclist, such as one meter, and then adjusts the center line 220 for the vehicle 100 based on that minimum safe distance. In some situations, the vehicle controller 110 uses the lane marking to determine the second side 215. In other situations, the vehicle controller 110 detects other vehicles, such as with proximity sensors 105, to act as the second side 215.

Figure 3:
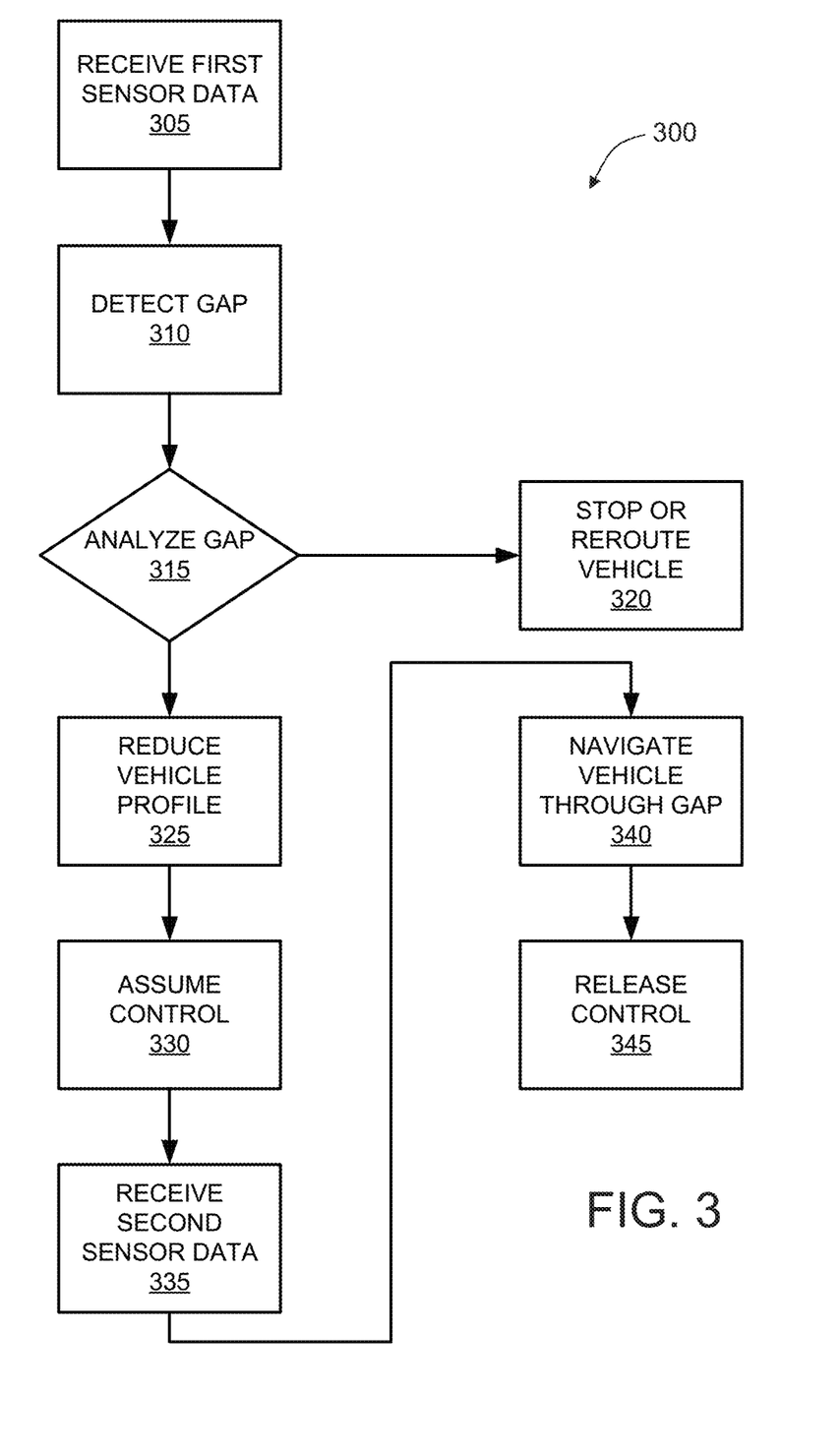
FIG. 3 illustrates flow chart of an exemplary computer-implemented process of navigating the vehicle shown in FIG. 1 through the narrow gap shown in FIGS. 2A and 2B.

FIG. 3 illustrates a flow chart of an exemplary computer-implemented process 300 of navigating the vehicle 100 (shown in FIG. 1) through the narrow gap 205 (shown in FIGS. 2A and 2B). In the exemplary embodiment, process 300 is performed by the vehicle controller 110 (shown in FIG. 1).

In the exemplary embodiment, the vehicle controller 110 receives 305 sensor data from at least a first sensor 105 of the plurality of sensors 105 (both shown in FIG. 1). In some embodiments, the first sensor 105 includes at least one of a camera, RADAR, LIDAR, or other sensor able to detect objects at a distance. Based on the received 305 sensor data, the vehicle controller 110 detects 310 a gap 205. The gap 205 is along the current route of travel of the vehicle 100. As described above, the vehicle controller 110 receives a plurality of sensor information from the plurality of sensors 105 (shown in FIG. 1). Based on the plurality of sensor information, the vehicle controller 110 detects 310 the gap 205. In the exemplary embodiment, the vehicle controller 110 detects 310 the gap 205 about half of a block away or the same distance that the vehicle controller 110 would react to a red streetlight. Accordingly, this distance would vary based on the speed of the vehicle 100, the limitations of the plurality of sensors 105, current visibility, the stopping distance of the vehicle 100, as well as other environmental factors.

In the exemplary embodiment, the vehicle controller 110 analyzes 315 the gap 205. The vehicle controller 110 compares the gap 205 to the profile of the vehicle 100. The vehicle controller 110 determines if there are any protrusions from the profile of the vehicle 100, such as, but not limited to, side mirrors 120 (shown in FIG. 1), cargo carriers, sports equipment, or any other feature of the vehicle that might increase the vehicle's profile and potentially impact one of the sides 210 or 215 (both shown in FIG. 2A) of the gap 205. In some embodiments, the user/driver 115 (shown in FIG. 1) has entered information about the items affecting the profile of the vehicle 100. These could be permanent modifications to the vehicle 100 or temporary additions, like a bicycle. In some embodiments, the vehicle controller 110 makes an assumption about the amount of extra height that a bicycle would add to the vehicle 100. In some embodiments, the vehicle controller 110 may determine the height of the vehicle 100 with bicycle based on one or more sensor readings. The vehicle controller 110 can also analyze the height of the gap 205 to ensure that the vehicle 100 can safely travel through the gap 205.

If the vehicle 100 will not fit through the gap 205, then the vehicle controller 110 stops or reroutes 320 the vehicle 100. If the vehicle 100 is currently autonomously travelling, then the vehicle controller 110 can inform the driver 115 and reroute 320 the vehicle 100 around the gap 205. If the driver 115 is controlling the vehicle 100, the vehicle controller 110 can inform the driver 115 that the vehicle 100 will not fit through the gap 205. This notification may include, but is not limited to, one or more warning lights on the dashboard, one or more warning sounds, pumping the brakes, vibrating the steering wheel, and/or flashing a warning on the infotainment panel 130 (shown in FIG. 1).

If the gap 205 is an acceptable size for the vehicle 100, the vehicle controller 110 then proceeds with process 300. The vehicle controller 110 can then work to reduce 325 the vehicle profile. The vehicle controller 110 can reduce 325 the vehicle profile by causing the side mirrors 120 (shown in FIG. 1) to be retraced or stowed. In some embodiments, retracting the side mirrors 120 is done automatically by the vehicle controller 110 controlling the side mirrors 120 to retract into the stowed position. The vehicle controller 110 can also instruct the driver 115, through the infotainment panel 130, to retract the side mirrors manually. The vehicle controller 110 could also retract other systems that may affect the vehicle profile, such as antennas.

In some embodiments, the vehicle controller 110 asks the driver 115 one or more questions about the current configuration of the vehicle 100, such as any cargo that may be on the exterior of the vehicle 100 or otherwise protruding past the normal profile of the vehicle 100. For example, if the gap 205 has an overhead clearance that is within a predetermined distance from the top of the vehicle 100, the vehicle controller 110 could ask the driver 115 if they have a cargo carrier, a bicycle, or any other objects on the top of the vehicle 100. In some embodiments, the vehicle controller 110 stops or slows the vehicle 100 during the reducing 325 the vehicle profile step.

In the exemplary embodiment, the vehicle controller 110 assumes 330 control of the vehicle 100 in preparation for travelling through the gap 205. In some situations, the vehicle 100 may already be in an autonomous travel mode, where the vehicle controller 110 is in control of the vehicle. In other situations, the vehicle 100 requests temporary control of the vehicle 100 from the driver 115, such as through the infotainment panel 130 (shown in FIG. 1). In some embodiments, the infotainment panel 130 displays a virtual button that the driver 115 can actuate to transfer control of the vehicle 100 to the vehicle controller 110. This allows the vehicle controller 110 to navigate 340 the vehicle 100 through the gap 205. The vehicle controller 110 receives 335 sensor data from a second set of sensors 105, such as, but not limited to, proximity sensors 105 while travelling 340 through the gap 205. While navigating 340 through the gap 205, the vehicle controller 110 continuously receives 335 sensor information from the plurality of sensors 105, including the second set of sensors 105, to ensure that the vehicle 100 has sufficient clearance 225 and 230 (shown in FIG. 2B) and is following the center line 220. In the exemplary embodiment, the proximity sensors 105 includes ultrasonic and electromagnetic sensors. For example, the proximity sensors 105 could be sensors 105 that are used for detecting objects near the vehicle, such as during parking or for detecting cross traffic. In some embodiments, the proximity sensors 105 detect objects near and around the bumper of the vehicle 100, such as within two meters.

While navigating 340 through the gap 205, the vehicle controller 110 can control the steering, throttle, and braking systems of the vehicle 100 to maneuver the vehicle 100 through the gap 205. In semi-autonomous vehicles 100, the vehicle controller 110 can use the electric steering systems that are used for lane keep assistance features, lane centering features, and/or auto parallel parking assist features. In still further embodiments, the vehicle controller 110 assists the driver 115 with travelling 340 through the gap 205. In these embodiments, the vehicle controller 110 can instruct the steering to provide light nudges in the appropriate direction to help the driver 115 steer through the gap 205. In some of these embodiments, the vehicle controller 110 controls the steering to become harder as the driver 115 turns the vehicle 100 away from the detected center line. In some of these embodiments, the vehicle controller 110 weights the steering so that steering to the center line 220 (shown in FIG. 2) is the easiest and has the least resistance, while steering away from the center line 220 requires the driver 115 to push against stronger resistance from the steering system.

When the vehicle 100 has cleared the gap 205, the vehicle controller 110 can release 345 control either to the driver 115 or the autonomous driving system of the vehicle 100.

In some embodiments, the driver 115, or other user of the vehicle 100, has stored one or more preferences in a memory device accessible by the vehicle controller 110. In at least one embodiment, the options are entered through the mobile device 125 (shown in FIG. 1) or the infotainment panel 130. In some embodiments, the options are entered at the beginning of the trip. As a part of the start-up sequence of the vehicle 100, the driver 115 or other user could enter that there is a bicycle or cargo carrier on top of the vehicle 100. The vehicle profile would also be impacted if there is a bicycle on a rack on the back of the vehicle 100, where the bicycle protrudes out past one or more sides of the vehicle 100. In this situation, the driver 115 could physically adjust the bicycle or set a user preference indicating the protrusion. Furthermore, the driver 115 could set user preferences to include the speed at which they would like the vehicle 100 to travel through obstacles, such as a gap 205.

In some further embodiments, the vehicle controller 110 accesses the air suspension to reduce 325 the vehicle profile. In some embodiments, vehicles 100 may use their air suspension system to raise the vehicle 100 when entering a driveway to avoid scraping the bottom of the vehicle 100. The vehicle controller 110 may also raise the vehicle 100 when traveling off-road and lower the vehicle 100 when travelling on standard roadways.

In some embodiments, process 300 is offered via a subscription service, wherein the driver 115 can subscribe to a service that provides the vehicle 100 and the vehicle controller 110 the capability to execute process 300. For example, if the driver 115 knows that they are going to be driving in area with narrow gaps 205, such as small alley ways and/or roads, the driver 115 can subscribe to the narrow gap 205 process 300. In these embodiments, process 300 might be updated on a regular basis to improve its accuracy, and the subscribed drivers 115 get access to the updated process 300.

Figure 4:
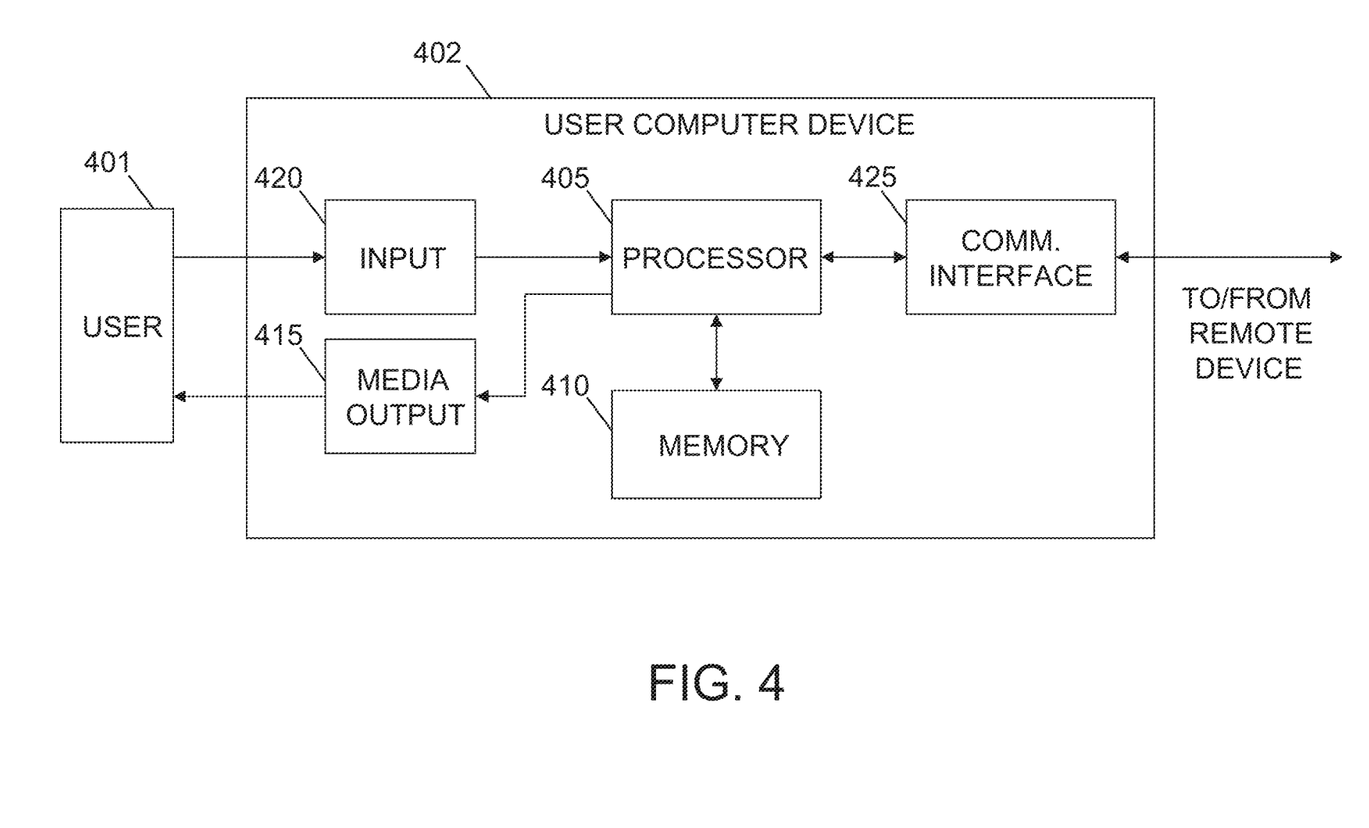
FIG. 4 depicts an exemplary configuration of the computer devices shown in FIG. 1, in accordance with one embodiment of the present disclosure.

In FIG. 4 depicts an exemplary configuration of the computer devices shown in FIG. 1, in accordance with one embodiment of the present disclosure. User computer device 402 may be operated by a user 401. In the exemplary embodiment, user 401 may be similar to driver 115 (shown in FIG. 1). User computer device 402 may include, but is not limited to, vehicle controller 110 and mobile device 125 (shown in FIG. 1). User computer device 402 may include a processor 405 for executing instructions. In some embodiments, executable instructions are stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401, such as through the infotainment panel 130 (shown in FIG. 1). A graphical user interface may include, for example, an online store interface for viewing and/or purchasing items, and/or a wallet application for managing payment information. In some embodiments, user computer device 402 may include an input device 420 for receiving input from user 401. User 401 may use input device 420 to, without limitation, select and/or enter one or more items to purchase and/or a purchase request, or to access credential information, and/or payment information.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as mobile device 125 or vehicle controller 110. Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from vehicle controller 110. A client application allows user 401 to interact with, for example, vehicle controller 110. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 may be programmed with the instruction such as illustrated in FIG. 3.

In some embodiments, user computer device 402 may include, or be in communication with, one or more sensors, such as sensor 105 (shown in FIG. 1). User computer device 402 may be configured to receive data from the one or more sensors and store the received data in memory area 410. Furthermore, user computer device 402 may be configured to transmit the sensor data to a remote computer device, such as vehicle controller 110 or mobile device 125, through communication interface 425.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

In the exemplary embodiment, the vehicle 100 includes a plurality of sensors 105 (shown in FIG. 1) and a vehicle controller 110. The vehicle controller includes at least one processor 405 in communication with at least one memory device 410. The vehicle controller 110 collects a plurality of sensor information observed by the plurality of sensors 105 during operation of the vehicle 100. The vehicle controller 110 analyzes the plurality of sensor information to detect a gap 205 (shown in FIG. 2) along the vehicle's path of travel. The vehicle controller 110 compares one or more dimensions of the gap 205 to one or more dimensions of the vehicle 100. In addition, the vehicle controller 110 controls the vehicle 100 to travel through the gap based on the comparison of the one or more dimensions of the gap 205 to the one or more dimensions of the vehicle 100.

Where the gap is a horizontal gap, the vehicle controller 110 determines a center line 220 of travel for the vehicle 100 through the horizontal gap 205 to avoid impacting one or more sides 210 and 215 (both shown in FIG. 2) of the gap 205. The vehicle controller 110 determines that one or more side mirrors 120 (shown in FIG. 1) need to be retracted prior to travel through the gap 205. In some embodiments, the vehicle controller 110 instructs at least one of a driver 115 (shown in FIG. 1) and/or a passenger to retract the one or more side mirrors 120 prior to travel through the gap 205. In other embodiments, the vehicle controller 110 instructs the vehicle 100 to retract the one or more side mirrors 120.

In further embodiments, vehicle controller 110 stores one or more preferences for travel through gaps 205, such as in a memory device 410. The one or more preferences include one or more protrusions on the vehicle 100 that affect the one or more dimensions of the vehicle 100. The vehicle controller 110 can also query at least one individual in the vehicle 100 about one or more protrusions to the vehicle 100 that affect the one or more dimensions of the vehicle 100.

In still further embodiments, the gap 205 is a vertical gap. In these embodiments, the vehicle controller 110 determines a vertical dimension of the vehicle 100. The vehicle controller 110 also determines a vertical dimension of the gap 205. The vehicle controller 110 compares the vertical dimension of the vehicle 100 to the vertical dimension of the gap 205.

In some embodiments, the vehicle controller 110 requests control of the vehicle 100 from the driver 115.

In additional embodiments, the vehicle controller 110 determines if the vehicle 100 will fit through the gap based on the comparison. If the determination is that the vehicle 100 will not fit through the gap 205, the vehicle controller 110 stops the vehicle 100. The vehicle controller 110 controls the vehicle 100 by transmitting instructions to one or more of a steering system, a throttle system, and a braking system of the vehicle 100.

In other embodiments, the vehicle controller 110 continuously receives real-time sensor information from the plurality of sensors 105 while travelling through the gap 205. The vehicle controller 110 controls the vehicle 100 based on the real-time sensor information.

In still other embodiments, the vehicle controller 110 controls the vehicle 100 to travel in a rearward direction.

For the methods discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The exemplary systems and methods described and illustrated herein therefore significantly increase the safety of operation of autonomous and semi-autonomous vehicles by reducing the potential for damage to the vehicles and the vehicle's surroundings.

The present systems and methods are further advantageous over conventional techniques the embodiments herein are not confined to a single type of vehicle and/or situation but may instead allow for versatile operation within multiple different types of vehicles, including ground craft, watercraft, aircraft, and spacecraft. Accordingly, these novel techniques are of particular value to vehicle manufacturers who desire to have these methods and systems available for the users of their vehicles.

Exemplary embodiments of systems and methods for securely navigating through narrow passages are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A vehicle comprising:
a plurality of sensors including a first sensor and a second sensor; and
a vehicle controller, wherein the vehicle controller is programmed to:
collect a first plurality of sensor information observed by the first sensor during operation of the vehicle;
analyze the first plurality of sensor information to detect a gap along the vehicle's path of travel;
compare one or more dimensions of the gap to one or more dimensions of the vehicle;
receive a second plurality of sensor information from the second sensor;
determine that one or more side mirrors need to be retracted prior to travel through the gap; and
control the vehicle to travel through the gap based on the comparison of the one or more dimensions of the gap to the one or more dimensions of the vehicle and the second plurality of sensor information from the second sensor.

2. The vehicle of claim 1, wherein the gap is a horizontal gap, and wherein the vehicle controller is further programmed to determine a center line of travel for the vehicle through the horizontal gap to avoid impacting one or more sides of the gap.

3. The vehicle of claim 1, wherein the vehicle controller is further programmed to instruct at least one of a driver and/or a passenger to retract the one or more side mirrors prior to travel through the gap.

4. The vehicle of claim 1, wherein the vehicle controller is further programmed to instruct the vehicle to retract the one or more side mirrors.

5. The vehicle of claim 1, wherein the vehicle controller is further programmed to store one or more preferences for travel through gaps, wherein the one or more preferences include one or more protrusions on the vehicle that affect the one or more dimensions of the vehicle.

6. The vehicle of claim 1, wherein the vehicle controller is further programmed to query at least one individual in the vehicle about one or more protrusions to the vehicle that affect the one or more dimensions of the vehicle.

7. The vehicle of claim 1, wherein the gap is a vertical gap, and wherein the vehicle controller is further programmed to:
determine a vertical dimension of the vehicle;
determine a vertical dimension of the gap; and compare the vertical dimension of the vehicle to the vertical dimension of the gap.

8. The vehicle of claim 1, wherein the vehicle controller is further programmed to request control of the vehicle from a driver.

9. The vehicle of claim 1, wherein the vehicle controller is further programmed to determine if the vehicle will fit through the gap based on the comparison.

10. The vehicle of claim 9, wherein the vehicle controller is further programmed to stop the vehicle if the determination is that the vehicle will not fit through the gap.

11. The vehicle of claim 1, wherein the vehicle controller is further programmed to control the vehicle by transmitting instructions to one or more of a steering system, a throttle system, and a braking system of the vehicle.

12. The vehicle of claim 1, wherein the first sensor is at least one of a camera or LIDAR, and wherein the second sensor is a proximity sensor.

13. The vehicle of claim 1, wherein the vehicle controller is further programmed to control the vehicle to travel in a rearward direction.

14. The vehicle of claim 1, wherein the vehicle controller is further programmed to control the vehicle by providing steering assistance to a driver to assist the driver in travelling through the gap.

15. The vehicle of claim 1, wherein the vehicle controller is further programmed to
detect a cyclist on one side of the gap;
determine a safe clearance for the cyclist; and
control the vehicle to travel based on the safe clearance for the cyclist.

16. The vehicle of claim 1, wherein the vehicle controller is further programmed to determine if the vehicle is subscribed to a narrow gap subscription service before controlling the vehicle to travel through the gap.

17. A computer device comprising:
at least one memory; and
at least one processor in communication with the at least one memory, the at least one processor programmed to:
collect a first plurality of sensor information observed by a first sensor during operation of a vehicle;
analyze the first plurality of sensor information to detect a gap along the vehicle's path of travel;
compare one or more dimensions of the gap to one or more dimensions of the vehicle;
receive a second plurality of sensor information from a second sensor different than the first sensor;
determine that one or more side mirrors need to be retracted prior to travel through the gap; and
control the vehicle to travel through the gap based on the comparison of the one or more dimensions of the gap to the one or more dimensions of the vehicle and the second plurality of sensor information from the second sensor.

18. The computer device of claim 17, wherein the gap is a horizontal gap, and wherein the at least one processor further programmed to determine a center line of travel for the vehicle through the horizontal gap to avoid impacting one or more sides of the gap.

19. A method for controlling a vehicle, the method implemented by a vehicle controller associated with the vehicle comprising at least one processor in communication with at least one memory, the method comprising:
collecting a first plurality of sensor information observed by a plurality of sensors including a first sensor during operation of a vehicle;
analyzing the first plurality of sensor information to detect a gap along the vehicle's path of travel;
comparing one or more dimensions of the gap to one or more dimensions of the vehicle;
receiving a second plurality of sensor information from a second sensor different than the first sensor;
determining that one or more side mirrors need to be retracted prior to travel through the gap; and
controlling the vehicle to travel through the gap based on the comparison of the one or more dimensions of the gap to the one or more dimensions of the vehicle and the second plurality of sensor information from the second sensor.

20. The method of claim 19, wherein the gap is a horizontal gap, and wherein the method further comprises determining a center line of travel for the vehicle through the horizontal gap to avoid impacting one or more sides of the gap.

* * * * *